Nov. 30, 1965   E. D. SILHA   3,220,555
AGEING FILTER FOR WHISKY IN GLASS BOTTLES
Filed May 1, 1963
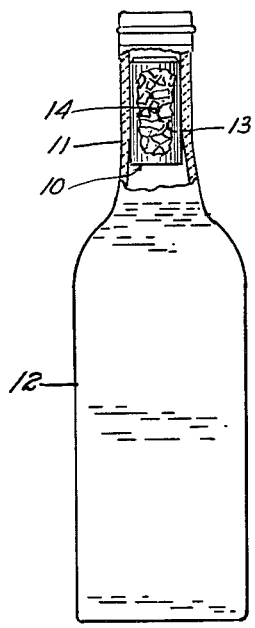
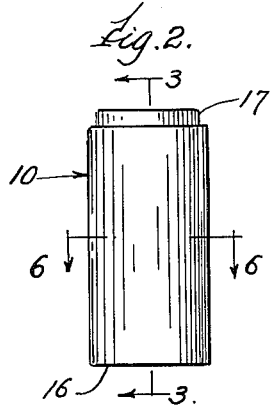
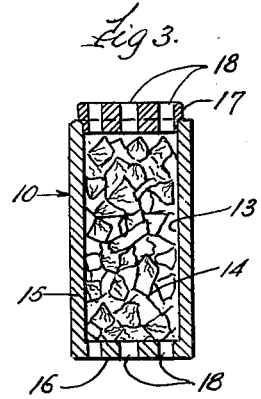
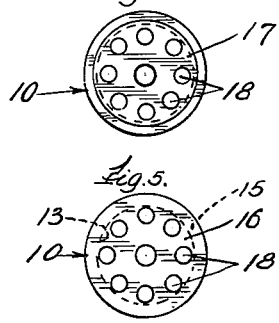
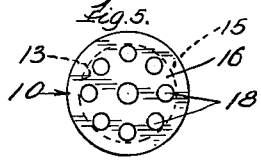
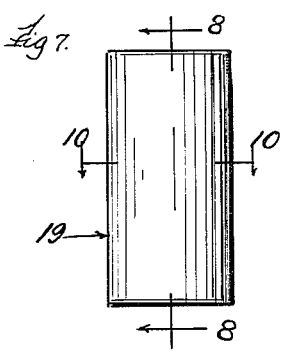
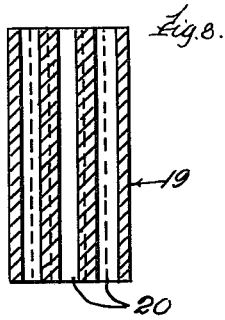
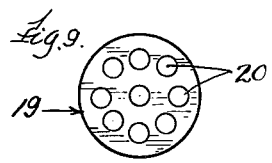
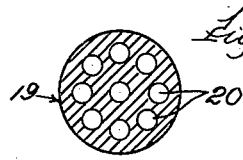
INVENTOR.
Elmer D. Silha.
BY
James R. McKnight
Attorney.

3,220,555
AGEING FILTER FOR WHISKY IN
GLASS BOTTLES
Elmer D. Silha, 17811 Grandview Drive, Hazel Crest, Ill.
Filed May 1, 1963, Ser. No. 277,304
3 Claims. (Cl. 210—282)

This invention relates to a filter containing or made of wood adapted to be fitted into the neck of a glass bottle filled with whisky, so as to filter, age and mellow the whisky, remove bitterness, and enhance flavor and color.

Ageing with wood is necessary to provide whisky with mellowness and smoothness, and is ordinarily obtained by storing whisky in wooden kegs. The porosity of the wood tends to trap bitterness, and the resins and other constituents in the wood tend to add a tinge of desirable flavor. Once the whisky is put into a glass bottle, the ageing stops.

It is among the objects of the invention to continue this ageing process after the whisky has been put into a glass bottle. With my ageing filter in position in the neck of the glass bottle, the proximity and contact of the wood with the whisky continues the ageing and mellowing process.

My filter also acts to provide improved flavor and color and to trap and filter out bitterness and other undesirables.

My invention also comprises such other objects, advantages, and capabilities as will later more fully appear and which are inherently possessed by my invention. While I have described in this specification preferred embodiments of my invention, yet it is to be understood that the same are susceptible to modification and change without departing from the spirit of my invention.

Referring to the drawings, FIG. 1 is an elevational view of a bottle partly in section to show my ageing filter in place; FIG. 2 is an elevational view of the preferred embodiment of my filter; FIG. 3 is a detailed sectional view on line 3—3 of FIG. 2; FIG. 4 is a top plan view; FIG. 5 a bottom plan view; and FIG. 6 a sectional view on line 6—6 of FIG. 2; FIG. 7 is an elevational view of a modified form of my ageing filter; FIG. 8 is a detailed vertical sectional view on line 8—8 of FIG. 7; FIG. 9 is an end view; and FIG. 10 is a detailed sectional view on line 10—10 of FIG. 7.

The preferred embodiment selected to illustrate my invention comprises a body member or cylinder 10 adapted to fit in the neck 11 of a glass bottle 12 filled with or containing whisky. The cylinder 10 is of such a size that once it is fitted into the neck of the bottle, it will be held therein by friction fit against the walls of the neck and cannot be removed by the pouring of the whisky from the bottle through the cylinder.

I prefer that my body member 10 be made of wood, but I may form it of plastic or any other desirable material. My body member 10 is cylindrical and has a hallow interior 13, to house a plurality of chips of wood 14. The hollow interior is closed by side walls 15, a bottom portion 16 and top portion 17. In forming cylinder 10, I prefer to form it with integral rounding side walls 15 and bottom portion 16 with an open top which is closed by top portion 17 after chips 14 have been placed in the hollow interior 13.

In each of bottom portion 16 and top portion 17, I provide a plurality of spaced holes 18, so that the whisky may pass therethrough when it is to be dispensed from the bottle. This construction serves as a filter or strainer while still restraining the chips 14 from being carried away in the dispensed whisky.

In another embodiment of my invention, I provide a solid wooden body member 19 similarly formed to fit within the neck of the bottle filled with whisky. This member 19 has a plurality of spaced holes 20 extending therethrough from top to bottom, so that whisky may be poured therethrough.

With my ageing filter in place in a glass bottle filled with or continuing whisky, the whisky continues to age and mellow because of its contact with the wood. This ageing continues while the glass bottle is on the retailers shelf, or in the home of the purchaser, and even as the whisky is poured out through the ageing filter as a final mellower and filter into your glass.

Harshness originally existing in the whisky is softened by the ageing process of my filter, resulting in a whisky of improved mellowness and smoothness. My filter provides a purifying effect which continues until it acts as a final filter when the whisky is poured out through it for use.

The wood of my filter also imparts improved flavor and color to the dispensed whisky.

I prefer that wood for constructing my body members 10 and 19, and the wood chips 14 placed in the hollow interior 13 of my body member 10 be of hickory, oak or other hard wood.

Having thus described my invention, I claim:
1. An ageing filter for whisky in a glass bottle comprising a hollow body member, said body member being positioned and fitted within the neck of a bottle containing whisky, with its side walls engaging the inner walls of the bottle by friction grip, a plurality of wood chips housed within body member, said body member having openings to permit the filtered passage of whisky therethrough, said wood chips by contact with the whisky in the bottle ageing the whisky for improved mellowness.

2. An ageing filter for whisky in a glass bottle comprising a hollow body member of wood, said body member being positioned and fitted within the neck of a bottle containing whisky, with its side walls engaging the inner walls of the bottle by friction grip, a plurality of wood chips housed within said body member, said body member having openings to permit the filtered passage of whisky therethrough, said body member of wood and said wood chips by contact with the whisky in the bottle ageing the whisky for improved mellowness.

3. An ageing filter for whisky in a glass bottle comprising a body member of wood, said body member being positioned and fitted within the neck of a bottle containing whisky, with its side walls engaging the inner walls of the bottle by friction grip, said body member having openings to permit the filtered passage of whisky therethrough, said body member of wood by contact with the whisky in the bottle ageing the whisky for improved mellowness.

References Cited by the Examiner
UNITED STATES PATENTS

| | | | |
|---|---|---|---|
| 818,478 | 4/1906 | Shwayder | 215—100 X |
| 2,865,138 | 12/1958 | Eidman et al. | 210—473 X |

REUBEN FRIEDMAN, *Primary Examiner.*